United States Patent [19]

Mattsson

[11] 4,425,073

[45] Jan. 10, 1984

[54] PIVOTALLY SUPPORTED GRIPPING MECHANISM

[75] Inventor: Karl-Erik Mattsson, Naesum, Sweden

[73] Assignee: Festo-Maschinenfabrik Gottlieb Stoll, Esslingen am Neckar, Fed. Rep. of Germany

[21] Appl. No.: 224,579

[22] PCT Filed: Jun. 28, 1979

[86] PCT No.: PCT/DE79/00066

§ 371 Date: Dec. 10, 1980

§ 102(e) Date: Dec. 10, 1980

[87] PCT Pub. No.: WO81/00076

PCT Pub. Date: Jan. 22, 1981

[51] Int. Cl.³ .................... B25J 3/04; B23K 11/36
[52] U.S. Cl. .................... 414/730; 219/86.24; 219/86.41; 294/103 R
[58] Field of Search ........... 294/88, 103; 414/730, 414/732, 5; 219/86.23, 86.24, 86.25, 86.41, 86.51, 86.7

[56] References Cited

U.S. PATENT DOCUMENTS 3,422,965 1/1969 Lloyd .................... 414/5
3,759,092 9/1973 Fishel .................... 414/5 X
3,865,424 2/1975 Jabkowski .................... 294/88
4,201,510 5/1980 Montjanoff .................... 414/730
4,229,136 10/1980 Panissidi .................... 414/730 X

FOREIGN PATENT DOCUMENTS 2636473 2/1978 Fed. Rep. of Germany .

OTHER PUBLICATIONS

Article-"Master-Slave-Manipulator EMSM I" by Koehler and Salaske, Kerntechnik, May 1976, pp. 212-218.
Article-"For Versatile, Heavy Handling Put a Man in the Loop" by Brust, Automation, Dec. 1973, pp. 78-83.
Article-"Force-Reflecting Electrohydraulic Servomanipulator" by Mosher and Wendel, Electro-Technology, Dec. 1960, pp. 138-141.

Primary Examiner—Leslie J. Paperner
Assistant Examiner—Terrance L. Siemens
Attorney, Agent, or Firm—Flynn, Thiel, Boutell & Tanis

[57] ABSTRACT

The invention deals with a gripping mechanism which is pivotable about an axis having a horizontal component, in particular a welding tong, with gripping members which can be moved toward one another, between which a workpiece can be clamped, and with a clamping drive, which is supplied with energy from an energy source and produces relative movement between the gripping members. An angle indicator determines the angular position of the gripping mechanism with respect to a vertical reference and a modulator responsive to an output signal of the angle indicator is connected between the energy source and the clamping drive and regulates the energy supplied to the clamping drive in dependence on the position of the gripping mechanism with respect to the vertical reference, so that the gripping members are held closed with a clamping force which is dependent in a predetermined manner on such angular position.

19 Claims, 6 Drawing Figures

PIVOTALLY SUPPORTED GRIPPING MECHANISM

FIELD OF THE INVENTION

The invention relates to a gripping mechanism and, more particularly, to a gripping mechanism which is pivotal about an axis having a horizontal component, has gripping members which can be moved toward and away from one another, a clamping mechanism for producing relative movement between the gripping members, and a source which supplies energy to the clamping mechanism.

BACKGROUND OF THE INVENTION

Gripping mechanisms are generally designated to grip a workpiece at a first place, to move it to a second place and to set it down there. The gripping mechanisms have for this purpose gripping means which clamp the workpiece between themselves. Among the movements which are to be carried out in practice are also pivoting movements about a horizontal axis, or about inclined axes with a limited horizontal projection. Such movements change the orientation of the gripping means with respect to the direction of the acceleration due to gravity, and this results in the weight of the gripping means contributing in a position-dependent manner to the clamping force and/or in changing the distance of the gripping means from the pivot axis. A change in the clamping force is undesired during transport of breakable articles or also during transport of easily deformable articles. The latter case exists for example in spot-welding tongs which are used at the same time for transport purposes, in which the part of the workpiece lying between the electrodes, which at the same time act as the gripping means, is plasticized by the welding operation. In order to prevent an uncontrolled deformation of the plasticized material volume during the pivoting of the welding tongs, due to the changing relatively large weight component of the gripping means (and the parts of the drives rigidly moved along with the gripping means), with conventional welding tongs pivoting of the workpiece must be delayed until the welding site has substantially cooled off. This means a considerable reduction in the productive capability of the welding mechanism.

The present invention is intended to further develop a pivotal gripping mechanism of the above-mentioned type so as to compensate for the change of the weight component of the moved parts of the gripping mechanism, which change occurs during the pivoting.

SUMMARY OF THE INVENTION

Starting out from a gripping mechanism of the above-mentioned type, this purpose is attained inventively by providing an angle indicator which determines the angular position of the gripping mechanism and a modulator which is responsive to an output signal of the angle indicator and is connected between the energy source and the clamping mechanism, the modulator varying the force exerted by the clamping mechanism on the gripping members in dependence on the angular position of the gripping mechanism.

It is understood that one can adjust a gripping mechanism having these structural characteristics also so that the clamping force is not maintained constant, but is changed in a preselected manner dependent on the angle of traverse of the gripping mechanism. Thus, it is possible for the angle indicator of the gripping mechanism to simultaneously act as a limit switch and through a modulator to control the clamping drive so that the workpiece after a preselected path of swing is set free by the gripping means. It is also possible, in particular during transport of heavy workpieces, to set at a large value the clamping force needed to produce a sure frictional gripping of a workpiece hanging between the gripping means and then to progressively reduce the gripping force as the workpiece pivots further away from the hanging position and the workpiece is increasingly supported by the gripping means.

However for pivotable welding tongs, it is preferred to maintain constant the closing force of the gripping means. In this way, the welding and cooling of the workpiece can occur under constant conditions simultaneously with the transport of the workpiece from a first place to a second place, and in this manner very low cycle times and a high throughput of the welding tongs are obtained. Expenditure for extra apparatus is thereby kept very low compared with common welding tongs. The invention also can be utilized in already existing welding tongs, which only requires that the angle indicator must be mounted on the welding tongs, and the modulator controlled from the angle indicator must be inserted into the connection between the energy supply and clamping drive.

A very considerable advantage of the inventive gripping mechanism is also that the workpieces are pivoted exactly on a circular path. In conventional gripping mechanisms, however, the reduction of the weight components of the movable parts of the gripping mechanism results in an enlargement of the distance between the workpiece and the pivot axis, since the energy supply of the clamping drive is constant.

The angle indicator which is used in the inventive gripping mechanism may be one which measures directly the change of the angle position of the gripping mechanism with respect to the direction of the acceleration of gravity. This has the advantage that during installation of the angle indicator, no absolute adjustment must take place. However, it is instead also possible to use an angle indicator which measures the change in the angular position of the gripping mechanism with respect to the frame which carries it, and this change is the same, but for a constant which is to be adjusted through adjusting the angle between the longitudinal axis of the gripping mechanism and the direction of the acceleration of gravity.

A further development of the invention includes the provision of a weight member adjustably supported on a lever which in turn is connected to a valve seat member of the angle indicator, which facilitates adjustability of the amplitude of the compensation in a simple manner; in other words, by adjusting the weight member it is easily possible to preselect the modulation of the energy supply of the clamping drive dependent on the deflection of the gripping mechanism from the vertical.

A further development of the invention includes the valve seat member also being biased by a spring arrangement, which makes it possible in a simple manner to preselect a position-independent base clamping force. Said base clamping force can in turn consist of two components, namely an absolute constant amount, which is preselected by a helical spring and an amount dependent on the instantaneously controlled and described already clamping force of the gripping mechanism.

Further developments of the invention, which include the use of a pressure-medium source as an energy supply, permit the angle indicator and modulator to be combined into a very compact unit, which can be arranged directly on the pivotal gripping mechanism as a position-dependent pressure regulator, so that long connecting lines between the modulator and the clamping drive are not needed. Such connecting lines would increase the reaction time of the compensation regulation, so that during a quick pivoting of the gripping mechanism one would not obtain a totally clean compensation.

A further development of the invention includes a linear position indicator having a final control element which is driven by a non-linear intermediate drive responsive to a driven part of a gearing, which produces a forced drive of the position indicator of the angle indicator which is practically independent from friction losses in bearings, since the final control element of the position indicator is clearly mechanically coupled with the pivoting movement of the gripping mechanism.

In a gripping mechanism of this type in which the gearing includes two annular gears respectively supported on stationary and pivotal parts of the gripping mechanism and the intermediate drive includes a cam plate provided on the second gear and a cam follower which is connected to the final control element of the position indicator, the type and manner and the degree of the desired compensation can be adjusted easily by profiling the cam plate.

A gripping mechanism in which a non-linear characteristic network is connected to the output of the linear angle indicator and to the control terminal of the modulator is particularly flexible with respect to its possibilities of use, since different compensation programs can be adjusted simply by exchanging characteristic networks, which is possible for example by using suitable plug-in boards.

BRIEF DESCRIPTION OF THE DRAWINGS

The invention will be discussed in detail hereinafter in connection with exemplary embodiments and reference to the attached drawings, in which.

DETAILED DESCRIPTION

Figures 3, 4:
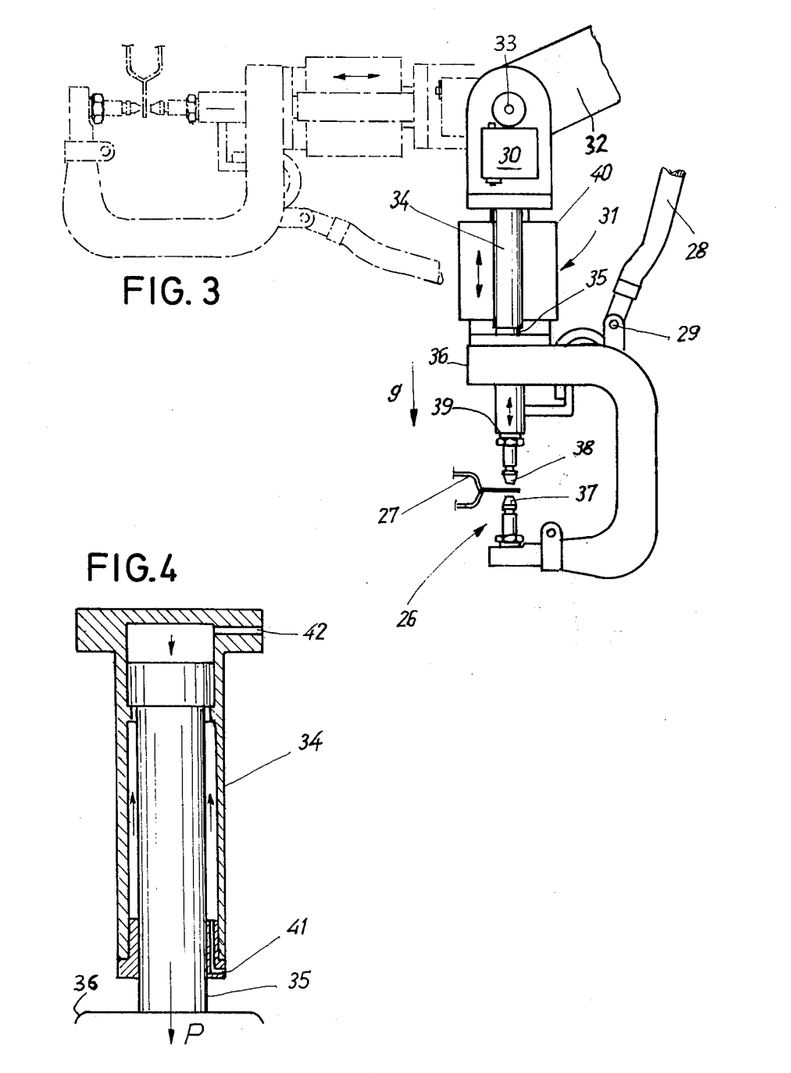
FIG. 3 is a side view of welding tongs which are pivotable about a horizontal axis and include the regulator of FIG. 1.
FIG. 4 is a cross-sectional side view of a first clamping cylinder of the welding tongs according to FIG. 3, FIG. 5 schematically illustrates a pneumatic circuit for controlling the clamping drive of welding tongs which are similar to those according to FIG. 3, but have a modified first clamping cylinder.

Reference is first made to FIG. 3. It shows a spot-welding tongs 26 for welding together a workpiece 27 which consists of two sheet-metal parts. The welding tongs 26 is hinged by means of a pivot pin 33 on a fixed support arm 32 of the frame of the welding mechanism. To pivot the welding tongs 26 a pivot rod 28 is used, one end of which is hinged through a pin 29 to the bar of the welding tongs 26, which bar is identified by reference numeral 36, and the other end of which is connected to a pivot drive, for example a double-acting pneumatic servomotor, which is not shown in the drawing. In the exemplary embodiment shown here, it is possible for the welding tongs 26 to be swung, by moving the pivot rod 28, from the position shown in full lines in the drawing into a position which is offset by 90° and is shown in dashdotted lines in the drawing. Spot-welding electrodes 37, 38 of the welding tongs 26 are used at the same time to hold the workpiece 27 during transport between the two end positions of the welding tongs 26. The electrodes 37, 38 are insulated from one another and from the frame of the welding mechanism by insulating parts which are not shown in detail and are connected to a welding power-supply unit, which is also not shown.

The electrode 37 is carried by the leg of the bar 36, which leg is on the bottom in the drawing. The bar 36 is connected to the piston rod 35 of a first clamping cylinder 34. The second electrode 38 is carried by the piston rod 39 of a second clamping cylinder 40. By pressure loading the lower working chamber of the clamping cylinder 34 and the upper working chamber of the clamping cylinder 40 (these cylinders form together the clamping drive of the welding tongs 26, which as a whole is identified by reference numeral 31), the electrodes 37 and 38 are moved toward one another, so that the workpiece 27 is seized between said electrodes. The effective closing force, however, obviously not only depends on the operating pressure of the clamping cylinders 34 and 40, but also on the weight component of the welding-tongs parts which move along with the electrodes, which weight component lies in the closing direction. The by all means considerable weight component of these parts in the closing direction of the electrodes obviously changes with the alignment of the welding tongs 26 with respect to the vertical, and thus, with respect to the direction of the acceleration of gravity g. It is reduced with the increasing pivoting of the welding tongs 26 away from the position illustrated in full lines in FIG. 3.

It is understood that the same problem exists also in the case of welding tongs which are completely freely movable in space, and which can thus be mounted in different orientations on a stationary workpiece, for example on horizontal and vertical spot-welding seams of a large container.

To maintain the closing force of the electrodes 37 and 38 constant and to maintain the distance of the electrodes from the pivot axis constant during movement of the welding tongs between its two end positions, a position-dependent working pressure modulation valve 30 is arranged on the welding tongs 26, which valve 30 can also be considered as a pressure regulator with a desired value which automatically follows up position-dependently and which will be described in greater detail hereafter with reference to FIG. 1.

Figure 5:
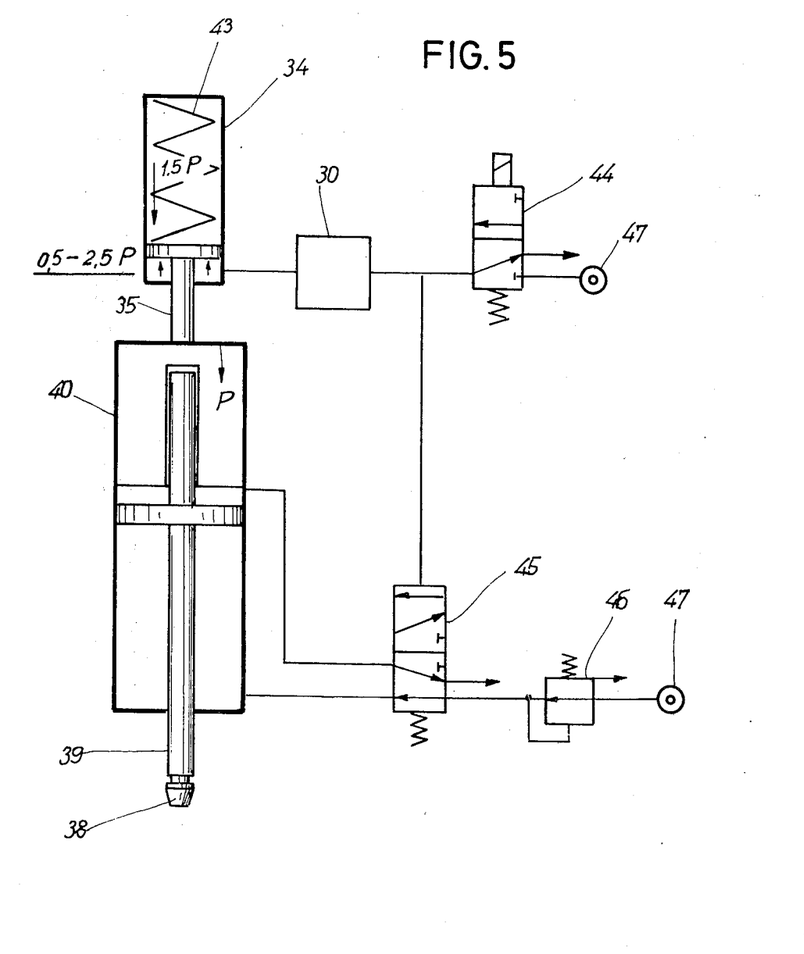

As is shown in FIG. 5, the clamping cylinder 34 can be connected through the pressure modulation valve 30 to a three-way valve 44 and through the latter selectively to a compressed-air source 47 or the atmosphere. The output of the valve 44 is at the same time connected to the compressed-air servomotor of a four-way valve 45, through which the double-acting clamping cylinder 40 can be connected to the compressed-air source 47 or the atmosphere. To limit the pressure, a pressure regulator 46 is additionally inserted between the compressed-air source 47 and the valve 45.

In the clamping drive according to FIG. 5, the clamping cylinder 34 is a single-acting working cylinder, the piston of which is initially forced by a spring 43 into its lower end position. It is also possible to instead use a double-acting working cylinder, as shown in FIG. 4. When using a double-acting working cylinder one must of course replace the three-way valve 44 with a four-way valve, and a lower operating opening 41 of the clamping cylinder 34 is then connected to the valve through the pressure modulation valve 30, while an upper operating opening 42 of the clamping cylinder 34 is connected directly to the valve 44.

The pressure modulation valve 30 regulates the pressure loading of the lower working chamber of the clamping cylinder 34, in such dependence on the angle of traverse of the welding tongs 26, that a balance for the weight component of the piston rod 35 and the parts carried by it is obtained, said weight component changing during pivoting. Thus, not only the closing force of the welding tongs remains unchanged, but also the distance of the electrodes and thus of the workpiece from the swivel axis is maintained constant. Details of the pressure modulation valve 30 will now be discussed in greater detail with reference to FIG. 1.

A two-part housing 1 of the pressure modulation valve 30 has an inlet opening 2 for compressed air, which can be connected to the valve 44, and an outlet opening 3, which can be connected to the clamping cylinder 34. A transverse opening 4 is widened above to form a pressure chamber 5, which is connected to the outlet opening 3. A shaft 6 of a valve member extends with radial clearance through the opening 4, which valve member carries a conical main control collar 7. The latter cooperates with a complementary sealing surface 8 fixed on the housing. A spring 9 serves to initially force the valve member into the closing position.

The shaft 6 has a conical end section 10, which cooperates with a valve-seat member or output part which is identified as a whole by the reference numeral 11, and which has an opening 12 which is coaxial with the shaft 6. The latter opening 12 is connected through radial openings 14 to the inside of the housing 1. An adapter nippe 15 is formed on the head 13 of the valve-seat member 11, which head defines the upper portion of the member 11, and a threaded ring 16 is screwed onto said adapter nipple 15, through which threaded ring 16 an elastomer sealing ring 16a is pressed against the underside of a membrane 17, through which the adapter nipple 15 extends. The outer edge of the membrane 17 is clamped tight, with respect to the flow medium, between the two parts 48a, 48b of a valve insert 48, in which is constructed the opening 4 and which is inserted tightly into an opening 49 of the housing 1.

The valve-seat member 11 can be shifted axially in a direction generally normal to the membrane 17 and with a radial clearance within the pressure chamber 5, which chamber is constructed in the part 48b and within an extension 5a of the pressure-chamber wall, which extension is constructed in the part 48a, and is initially forced downwardly in the drawing by a spring 18. The pressure chamber 5 and membrane 17 thus serve as a form of gas spring which biases the valve-seat member 11 with a force dependent on the pressure in the chamber 5. The upper end of the spring 18 is supported on the housing 1. To center the ends of the spring 18 a first spring seat 19 is screwed into the housing 1 and a second spring seat 19a is screwed into the upper end of the valve-seat member 11.

A fork section 20 of a lever 21 which extends generally parallel to the membrane 17 is supported pivotably on the housing 1 by means of a bearing pin 21a, which is directly adjacent the spring seat 19a and thus also lies near the axis of movement of the valve-seat member 11. The valve-seat member 11 is connected to the fork section 20 through a further pin 22.

A weight 23 has a through opening 24, in which it receives the lever 21. After adjusting the distance of the weight 23 from the axis of the bearing pin 21a, the weight can be fixed on the lever 21 by a setscrew 25.

Figure 1:
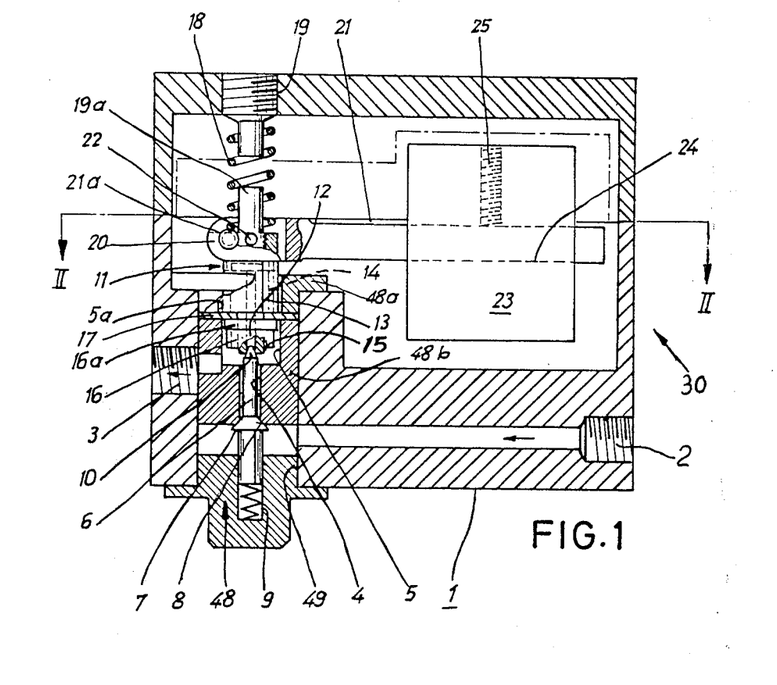
FIG. 1 is a cross-sectional side view of a position-dependent pressure regulator which embodies the invention and is adapted for use with pivotable welding tongs to provide a position-independent closing force and a distance of the electrodes from the pivot axis which is independent at the angular position of the tongs.

The above-described pressure modulation valve 30 operates as follows:

FIG. 1 shows the pressure modulation valve 30 in the same orientation it assumes with the welding tongs 26 positioned as shown in full lines in FIG. 3. First it is assumed that the connection between the inlet opening 2 and the compressed-air source 47 is interrupted, the valve 44 thus in its position of FIG. 5. The shaft 6 is under these conditions initially urged at a maximum in a direction corresponding to disengagement of the main control collar 7 from the valve seat 8, both by the force of the spring 18 and also by the force of the weight 23, which acts through the full lever arm, and which force acts in the same direction as the spring force. The pressure which still exists in the pressure chamber 5, and which causes the membrane 17 to apply an oppositely directed force to the valve-seat member 11, is also overcome by the combined force of the spring 18 and the weight 23 as is the initial tension of the spring 9. This causes the main control collar 7 to assume its maximum separation from the valve seat 8.

If the valve 44 is now switched over into its working position, the air under pressure flows through the pressure modulation valve 30 to the clamping cylinder 34. The pressure which then builds up in the latter is also applied to the underside of the membrane 17. When the force applied by the membrane 17 to the valve seat member 11 and the force of the spring 9 together become greater than the force of the spring 18 and of the weight 23, then the main control collar 7 is again placed against the sealing surface 8 as shown in FIG. 1. A maximum pressure, predetermined by the size of the springs 9, 18, the cross section of the membrane 17, the size of the weight 23 and the distance of the weight 23 from the bearing pin 21a now exists in the clamping cylinder 34.

If the pressure modulation valve 30 is now rotated in a clockwise direction out of its position shown in FIG. 1 (by pivoting the tongs 26 toward their second end position shown in dash-dotted lines in FIG. 3), then the effective lever arm, through which the weight 23 acts on the valve seat member 11, is shortened, generally according to the cosine law, as a function of the angle of pivoting. This accordingly reduces the force which effectively acts on the valve seat member 11, so that the valve seat member 11 is now disengaged slightly from the end section 10 due to the pressure in the pressure chamber 5. The opening 12 is now freed and air under pressure flows through the openings 12 and 14 out of the pressure chamber 5 until the valve seat member 11 is again engaged with the end section 10 by the force of the weight, which due to the shorter effective lever arm is smaller, and the force of the spring 18. In this manner, the pressure in the clamping cylinder 34 has now also been adjusted, reducing same in dependence on the angle of pivoting of the welding tongs 26 relative to the maximum pressure set in the initial position. The degree of modulation by the pressure modulation valve 30 can be adjusted easily through the stiffness of the spring 18, the size of the weight 23 and the size of the preadjusted distance between weight 23 and bearing pin 21a. The larger the force of the spring 18 compared with the force of weight, the smaller is the degree of modulation, and vice versa.

After pivoting the pressure modulation valve 30 through a full 90°, the contribution of the weight 23 to the initial tensioning of the valve seat member 11 has totally disappeared, since the effective lever arm has become zero. The weight 23 hangs vertically below the bearing pin 21a. One is thus left with only the basic initial urging of the valve seat member 11 by the spring 18.

If one rotates the pressure modulation valve 30 through a further 90° (entire angle of rotation 180°), then the valve seat member 11 is now urged additionally by the force of the weight in the opening direction. In this position, the minimum pressure in the clamping cylinder 34 is obtained. In order that a total relief of pressure in the clamping cylinder 34 does not in this position take place, the spring 18 is so initially tensioned that it can, even when the full force of weight and the force of the spring 9 act in the same direction, provide a force larger than the sum of said last-mentioned forces.

From the above it is clear that the pressure loading of the clamping cylinder 34 is so adjusted to the angle of pivoting of the welding tongs 26 by the pressure modulation valve 30, that a weight compensation of the welding tongs for all angles of pivoting is obtained. By this also, the distance of the piston rod 35 from the pivot point of the welding tongs (axis of the swivel pin 33) remains constant during pivoting of the welding tongs 26.

Figure 6:
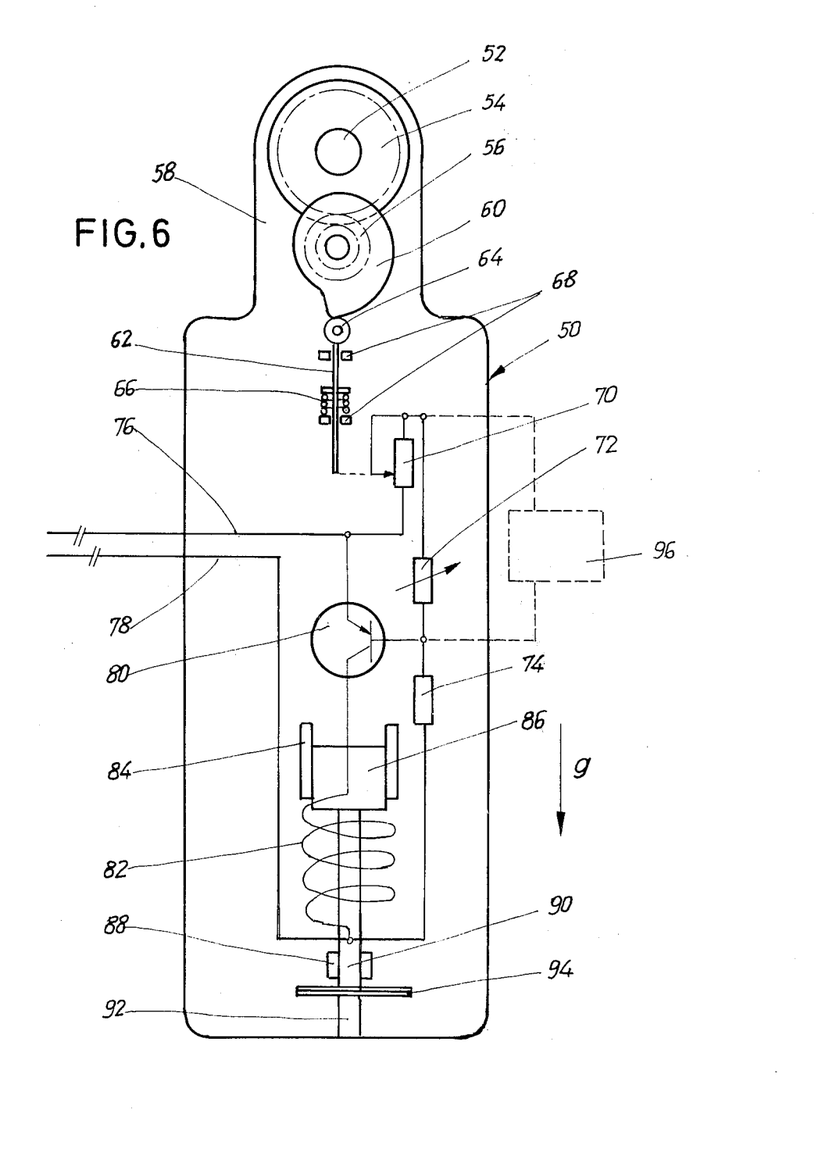
FIG. 6 is a schematic side view of an alternative embodiment of a gripping mechanism for workpieces, which is pivotable about a horizontal axis and includes an electromagnetic clamping drive and a modified angle indicator and a modified modulator.

FIG. 6 schematically illustrates a portion of an electromagnetic gripping mechanism with a position-independent clamping force. Part of this gripping mechanism is a gripping arm identified as a whole by reference numeral 50 and which arm can be pivoted about a fixed horizontal pivot pin 52.

A gear 54 is mounted fixed against rotation on said swivel pin 52. A second gear 56 mates with said gear 54, which second gear is supported on a plate 58 of the gripping arm 50. The gear ratio of the gears 54 and 56 amounts to 4:1, so that a 90° pivoting of the gripping arm 50 provides a full rotation of the gear 56. A cam plate 60 with a spiral-like cam surface is fixedly connected to the gear 56 for rotation therewith. A cam-follower member 62 bears on the cam plate 60 under the force of a spring 66 and is guided for longitudinal movement in sliding guides 68 which are fixedly connected to the plate 58.

The cam-follower member 62 is mechanically connected to the slider of a potentiometer 70, to which a further adjustable resistor 72 and a fixed resistor 74 are connected in series. The above-described series connection is connected through lines 76, 78 to the terminals of a d.c. source.

A power transistor 80 is also connected between the lines 76 and 78 with a coil 82 connected in series to its collector/emitter path. The base of the transistor 80 is connected to a junction point in the first series connection, which junction point lies between the resistors 72 and 74, and which series connection provides the bias network for the transistor 80. An armature, which is movable by the coil 82, has a head 86 which runs in guideways 84 fixed to the plate 58. A rod-shaped gripping means 90 is formed on said head and runs in guideways 88 also fixed to said plate. A counter-gripping means 92 is fixed to the plate 58 in alignment with the gripping means 90. A workpiece 94, which here consists of two sheet-metal plates, is shown clamped between counter-gripping means 92 and gripping means 90.

In the position of the gripping arm 50 shown in FIG. 6, the weight of the armature of the coil 82 acts in the same direction as the magnetic force, namely in the direction of the acceleration of gravity g and thus provides a portion of the closing force of the gripping mechanism. During pivoting of the gripping arm 50 from its vertical orientation shown in FIG. 6, an increasing portion of the weight of the armature is supported by the guideways 84 and 88, so that the closing force of the gripping means would be reduced accordingly, if compensation were not provided for this.

By pivoting the gripping arm 50 in a clockwise direction, the cam plate 60 is also rotated in a clockwise direction through the gearing formed by the gears 54 and 56. The cam-follower member 62 thus moves upwardly and this reduces the resistance of the potentiometer 70. This yet more strongly biases the transistor 80 toward conduction so that the current through the coil 82 is increased and the magnetic contribution to the closing force of the gripping mechanism is increased.

This increase can be adjusted by suitably profiling the peripheral edge of the cam plate 60 so that compensation for the decrease of the contribution of the weight of the armature is obtained. The distance of the cam plate edge from the axis of the cam plate must for this change be substantially cosine-shaped. The constant, nonmodulated base part of the magnetic force can be adjusted in the simplest manner by adjusting the resistor 72; however, it is also possible to replace the cam plate 60 for adjusting the base part of the magnetic force with a cam plate having a less strongly modulated lateral edge.

It can be advantageous for certain uses to increase the closing force of the gripping mechanism as the latter pivots out of its vertical alignment. In the position of the gripping arm 50 in FIG. 6, the weight of the workpiece 94 is supported largely by the counter-gripping means 92. Thus, in this alignment of the gripping arm, the workpiece 94 only need be held with a smaller clamping force. After a pivoting through 90°, however, the clamping force must be great enough that the frictional force it produces, between gripping means 90 and counter-gripping means 92 on the one side and the workpiece 94 on the other side, is greater than the weight of the workpiece. For this it may be necessary to increase the clamping force, in particular when the friction coefficient between the gripping means front surfaces and the workpiece surfaces is low.

Also, an increase of the magnetic contribution to the closing force, during pivoting of the gripping arm 50 from its vertical position, can be achieved easily by a suitable profiling of the cam plate 60.

In view of an easy adjustability of the gripping mechanism to various working conditions, it is also possible to use a purely spiral, "linear" cam plate 60, so that one obtains voltage changes across the resistor 70 which are proportional to the angle of pivoting. It is then possible to carry out the modification of said voltage change, according to a cosine law or a different desired law, electrically in a characteristic network 96 which has active structural elements, for example diodes, and which is switched across the fixed resistor 72 and which is illustrated in dashed lines in FIG. 6. This network can be arranged on a plug-in board and can then easily be exchanged for a different one with a different characteristic.

It is clear to the man skilled in that art that one can use a compensation mechanism, as above described in FIG. 6 in connection with the gripping arm 50, also with pneumatic working cylinders like the clamping cylinders 34 and 40. For this purpose the armature section 90 needs only be connected to the final control element of a normal proportional regulating valve, which is then switched into the feed line to the clamping cylinder 34.

Figure 2:
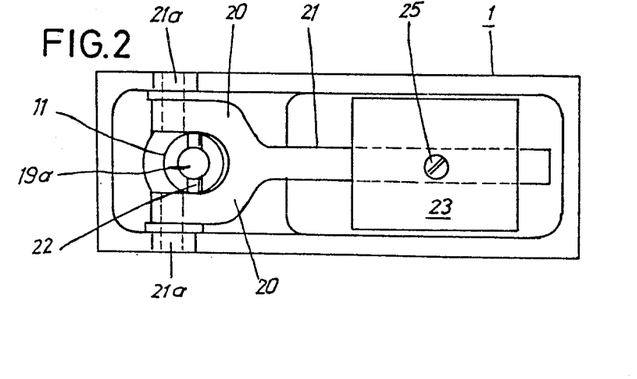
FIG. 2 is a cross-sectional view of the pressure regulator according to FIG. 1, taken along the line II—II of FIG. 1.

The valve which is shown in the various figures of the drawings thus has a valve housing 1 with an inlet channel 2 and an outlet channel 3. An opening 4 and a chamber 5 for a valve member 6, which carries a closing element 7, are provided between the channels 2 and 3, which closing element can be moved, by means of a spring 9 which presses against the one end of the valve member 6, into a sealing position against a valve seat 8 at one end of the opening 4. The opposite end of the valve member is constructed as a conical closing element 10, which reaches toward the outer edge of an opening 12 in a valve seat member a piston element which is identified in general by reference numeral 11 and rests thereagainst.

The piston element 11 has an upper, wide part 13 with a cross opening 14 which is connected to the opening 12 and further has a lower, more narrow part 15 with an external thread, on which a nut element 16 is screwed. Between the part 13 of the piston element 11 and the nut element 16 is clamped sealingly a movable membrane 17. The membrane 17 is also sealingly clamped against the sidewall of the chamber 5, in order to form a tight upper closure of the chamber 5. A spring 18 is clamped between the upper surface of the part 13 of the piston element 11 and a screw 19, which screw is screwed into a tapped hole in the valve housing 1. The spring force can be adjusted with the help of the screw 19, which acts on the element 11 and thus on the valve member 6 in the opening direction.

The legs 20 of a y-shaped lever 21 are supported pivotally by means of a pin 21a in the side walls of the valve housing 1. The legs 20 extend on both sides of the piston element 11 and are engaged pivotally thereon by means of a pin 22. The lever 21 carries a weight 23. Through the action of lever 21 with its weight 23 and through the connection thereto of the element 11 the valve member 6 is loaded, aside from the force of the spring 18 in addition by a force which depends on the length of the lever, the size of the weight and the position of the valve in the chamber. In the position of the valve shown in FIG. 1, one obtains maximum loading in the opening direction by the weight 23, since the effective length of the lever is at a maximum in the position shown. Furthermore the force of the spring 18 and the force of the weight 23 act in the same direction, which means that the valve member is loaded to the maximum in the opening direction and consequently adjusts the maximum pressure on the outlet side. A certain maximum pressure can be adjusted both by the adjustment of the initial force of the spring 18 by means of the screw 19 and also by the adjustment of the position of the weight 23 on the lever 21. For this purpose, the lever 21 extends into a through opening 24 in the weight. The weight is fixed on the lever with the help of a clamping screw 25.

The function (mode of operation) of the valve is hereafter described from the starting point of its position shown in FIG. 1, whereby, however, it is assumed that the connection to a compressed-air source not shown on the inlet side is interrupted and that the air pressure is lower in a pneumatic arrangement (for example a compressed-air cylinder not shown) connected to the outlet side, than the adjusted maximum pressure of the valve. Under these circumstances the valve member is exposed to the maximum force of the spring 18 and the weight 23 in the opening direction, which force overcomes the air-pressure force against the membrane 17 in the chamber 5 and the force of the spring 9, so that the closing element 7 is lifted out of the seat 8 and thus the valve is opened. If the connection with the compressed-air source is open, air flows through the valve to the cylinder on the outlet side. The pressure in the cylinder influences the membrane 17 and when the air-pressure force and the force of the spring 9 together exceed the force of the spring 18 and the weight 23, the element 11 and the valve member 6 are lifted, until the closing element again seals off against the seat 8, as can be seen from FIG. 1. The maximum pressure adjusted by the valve now exists in the cylinder not shown.

When the valve in FIG. 1 is pivoted in any desired direction from the position shown, the effective length of the lever 21 is reduced first successively, whereby the force of the weight 23 onto the element 11 is reduced. The element 11 is thereby lifted from the conical end 10 of the valve member 6 under the effect of the pressure which exists in the chamber 5 and acts on the membrane 17, so that said pressure can be lowered, by having air flow out through the openings 12 and 14, until the forces which act onto the element and which are directed upwardly and downwardly balance one another and the opening 12 is again closed by the conical end 10 of the valve member. A lower pressure which is determined by the new position of the valve is thereby adjusted.

After pivoting of the valve through 90° from its position of FIG. 1, the effective length of the lever 21 has dropped to zero, whereby the element 11 is loaded only by the spring 18 in the opening direction. By continued pivoting in the same direction the effective lever grows successively, in order to again achieve its maximum length after a pivoting through 180° from the position of FIG. 1. The weight again loads the element 11 with a maximum force, but now in closing direction of the valve, acting against the force of the spring 18. The valve is now in the position which results in a minimum pressure in the connected cylinder. The spring 18 is dimensioned so that it loads the element 11 with a force greater than the sum of the force of the spring 9 and the maximum force of the weight 23.

FIG. 3 shows a valve 30 according to the invention, mounted on a welding tongs 31 suspended pivotably at the end of an arm 32 on an automatic resistance welding machine. The valve 30 is mounted on the actual welding tongs 31 behind the pivot axis 33 so that it changes position at the same time as the tongs 31, as indicated by dashed lines.

A counterbalance cylinder is identified by the reference numeral 34, the pressure of which is regulated by the valve 30 and the piston rod 35 of which carries the bar 36 of the welding tongs. The one welding electrode 37 is fixedly mounted in the usual manner on a bar leg, while the other welding electrode 38 is mounted by the electrode holder 39 on the piston rod of a welding cylinder 40 which is held by the bar, as illustrated in greater detail in FIG. 5.

Counterbalance cylinder 34 and welding cylinder 40 lie side-by-side in FIG. 3, while they are mounted one behind the other in FIG. 5.

The inlet 41 of the cylinder 34, on the side of the piston rod, is connected to the outlet of the valve 30, while the inlet 42, on the piston side, is connected to a compressed-air source such that a pressure exists in the cylinder chamber on the piston side, which pressure applies an outwardly directed force on the piston, which force is larger- for example 1.5 times larger- that the weight of the welding tongs 31. This assures that the tongs 31 is fixed in a moved-out "parking position" during pivoting from a downwardly directed rest position into an upwardly directed welding position. FIG. 5 shows a coupling diagram for the counterbalance cylinder 34 with the welding cylinder 40. Differing from the embodiment in FIG. 4, the piston in the counterbalance cylinder 34 here is exposed to an outwardly directed force of a spring 43. A valve 44, for starting the welding cycle, is in FIG. 5. The valve 44 controls the valve 45 for the activation of the welding cylinder 40. The electrode force is regulated by a pressure regulator valve 46.

In order to assure under all circumstances the above-mentioned position of the tongs 31 in the moved-out rest position, a spring 43 is chosen as an example, which spring loads the piston of the counterbalance cylinder 34 with a force, which amounts to 1.5 P., wherein P. is the weight of the welding tongs 31. It is thus true that the pressure regulator valve 30 is supposed to adjust, in the position of the welding tongs 31 shown in FIG. 3, the maximum pressure in the cylinder 34, which is supposed to apply an upwardly directed force of 2.5 P., so that the upwardly directed force can balance the force of the spring 43 and the weight of the tongs 31. After pivoting of the tongs 31 into the horizontal position shown in dashed lines in FIG. 3, the weight of the tongs is not supposed to be balanced out, but only the force 1.5 P. which is directed outwardly onto the piston rod 35. These mentioned functions are obtained through a valve 30, which is adjusted so that the spring 18 effects an opening force, which amounts to 1.5 times the maximum force of the weight 23, whereby it is true that the force alone can adjust a pressure, which results in an inwardly directed force of 1.5 P. in the cylinder 34, namely a force which balances the force of the spring 43. When these conditions are met, one obtains (1) in the vertical downwardly directed position of the tongs, a balancing force of 2.5 P. through cooperation between the forces of the spring 18 and the weight 23;

(2) in the horizontally outwardly directed position of the tongs, a balancing force of 1.5 P. through the action of the spring force 18 alone; and (3) in the vertically upwardly directed position of the tongs, a balancing force of 1.5 P. due to the fact that the force of the weight 23 acts against the spring force 18.

In the inbetween positions, the valve provides pressure which is always proportional to the force needed for correct balancing.

Of course the invention is not limited to the above-described embodiments, but can be modified in several ways. For example, the valve can be designed with a sealing piston instead of a membrane 17. Furthermore, the spring 18 can be replaced with a weaker spring and an air chamber, which moreover results in a more even characteristic at an outwardly directed air pressure. The above-described use in an automatic welding machine is intended to illustrate the operation and the advantages of the valve embodying the invention. The valve, however, has a wide range of uses, in which its special characteristics can be utilized.

The embodiments of the invention in which an exclusive property or privilege is claimed are defined as follows:

1. A gripping mechanism which is supported for pivotal movement about a first axis having a horizontal component, comprising two gripping means supported for relative movement toward and away from one another, between which a workpiece can be clamped, clamping means supplied with energy by an energy source for effecting said relative movement of said gripping means, an angle indicator which measures the angular position of said gripping mechanism with respect to a vertical reference, and a modulator responsive to said angle indicator and connected between said energy source and said clamping means, the energy supplied from said energy source to said clamping means being regulated by said modulator in dependence on the angular position of said gripping mechanism with respect to the vertical reference as measured by said angle indicator, said clamping means exerting on said gripping means a clamping force which in a predetermined manner is dependent on the angular position of said gripping mechanism, said angle indicator including a weight member which is supported for pivotal movement about a second axis spaced from its center of gravity, said weight member being adjustably supported on a lever which is supported for pivotal movement about said second axis and is coupled to a movable output part of said angle indicator.

2. A gripping mechanism according to claim 1, wherein said output part is biased by a spring arrangement.

3. A gripping mechanism according to claim 2, wherein said spring arrangement includes a helical spring which is coaxial with the direction of movement of said output part of said angle indicator.

4. A gripping mechanism according to claim 2, wherein said spring arrangement includes a gas spring having a working chamber which is supplied with a fluid having a pressure which is proportional to said clamping force.

5. A gripping mechanism according to claim 4, wherein said output part of said angle indicator has an annular groove in which is snugly received a membrane which forms a wall of said chamber of said gas spring.

6. A gripping mechanism according to claim 4, wherein said clamping means includes a pneumatic drive, and wherein said chamber of said gas spring is in communication with said clamping means.

7. A gripping mechanism according to claim 6, wherein said output part of said angle indicator has a pressure-relief channel which leads away from said chamber, said channel having at its pressure chamber end a valve seat which cooperates with an end section of a valve member of a valve, which can connect said clamping means to said energy source, which is a source of pressurized fluid.

8. A gripping mechanism according to claim 7, wherein said valve member has a main control collar which is remote from said end section thereof, said collar cooperating with a further valve seat provided on a housing of said angle indicator; wherein a shaft of said valve member extends with clearance through an opening in said housing; and wherein said valve member is urged by a spring toward a position in which said main control collar thereof engages said further valve seat.

9. A gripping mechanism according to claim 8, wherein cooperating sealing surfaces provided on said main control collar and said further valve seat are of complementary frusto-conical shape.

10. A gripping mechanism according to claim 1, wherein said second axis is adjacent the axis of movement of said output part.

11. A gripping mechanism which is supported for pivotal movement about an axis having a horizontal component, comprising two gripping means supported for relative movement toward and away from one another, between which a workpiece can be clamped, clamping means supplied with energy by an energy source for effecting said relative movement of said gripping means, an angle indicator which measures the angular position of said gripping mechanism with respect to a vertical reference, and a modulator responsive to said angle indicator and connected between said energy source and said clamping means, the energy supplied from said energy source to said clamping means being regulated by said modulator in dependence on the angular position of said gripping mechanism with respect to the vertical reference as measured by said angle indicator, said clamping means exerting on said gripping means a clamping force which in a predetermined manner is dependent on the angular position of said gripping mechanism, said angle indicator including a gearing having a reaction part fixed against movement with said gripping mechanism and an action part supported on a part of said pivotally supported gripping mechanism, said action part including a driven part which operates a position indicator.

12. A gripping mechanism according to claim 11, wherein said position indicator operates linearly and has a final control element which is driven, through a nonlinear intermediate drive, by said driven part of said gearing.

13. A gripping mechanism according to claim 12, wherein said reaction part of said gearing includes a first annular gear and said action part includes a second annular gear which is pivotally supported on said gripping mechanism, and wherein said intermediate drive includes a cam plate which is provided on said second annular gear, on which cam plate slides a cam-follower member which is connected to said final control element of said position indicator.

14. A gripping mechanism according to claim 11, including a nonlinear characteristic network is connected after the linearly operating angle indicator which is connected to a control terminal of said modulator.

15. An apparatus for gripping a workpiece, comprising a gripping mechanism which is supported for pivotal movement about a first axis having a horizontal component and which has two gripping members supported thereon for relative movement toward and away from each other, means for effecting movement of said gripping members away from each other, means for sensing the angular position of said gripping mechanism with respect to a vertical reference, and clamping means responsive to said angular position sensing means and cooperable with said gripping members for exerting a clamping force on said gripping members which urges them toward each other, said clamping means varying said clamping force in dependence on said angular position sensed by said angular position sensing means, wherein said clamping means is fluid actuated and said clamping force is proportional to the pressure of fluid supplied to said clamping means, and wherein said angular position sensing means includes housing means defining a closed chamber which is in continuous fluid communication with said clamping means, means responsive to pivotal movement of said gripping mechanism and to gravity for producing a force having a magnitude which is dependent on the angular position of said gripping mechanism, and valve means for regulating the supply of pressurized fluid to said fluid actuated clamping means in dependence on the angular position of said gripping mechanism, said valve means being responsive to a first force which is proportional to the fluid pressure in said chamber and to a second force which includes said force produced by said gravity responsive meas for bleeding fluid from said chamber to reduce the pressure therein when said first force is greater than said second force.

16. The apparatus according to claim 15, wherein said angular position sensing means is supported on said gripping mechanism and pivots therewith about said first axis, wherein said valve means includes a flexible membrane which defines a wall of said chamber, a valve seat member supported on and extending through said membrane and having a passageway therein providing fluid communication between opposite sides of said membrane, said valve seat member being movable in a direction generally normal to said membrane by flexing said membrane and having a valve seat thereon at the end of said passageway within said chamber and on a side thereof facing substantially in said direction, and a valve member supported in said chamber and sealingly engageable with said valve seat to obstruct fluid flow through said passageway, and wherein said gravity responsive means includes a lever which is supported for pivotal movement about a second axis generally parallel to said first axis and has a center of gravity spaced from said second axis, said lever being operatively coupled to said valve seat member at a location spaced from said second axis.

17. The apparatus according to claim 16, wherein said lever extends approximately parallel to said membrane and includes a weight spaced from and adjustable radially of said second axis, and wherein said valve means includes a spring which yieldably urges said valve seat member toward said valve member, includes means defining a passage in said housing means providing fluid communication between said chamber and a supply of pressurized fluid, includes said valve member being supported for movement relative to said housing means between first and second positions, said valve member being closer to said valve seat member in said first position, said passage being obstructed when said valve member is in said first position and being progressively opened as said valve member moves toward said second position, and includes a spring which yieldably urges said valve member toward said first position.

18. An apparatus for gripping a workpiece, comprising a gripping mechanism which is supported for pivotal movement about a first axis having a horizontal component and which has two gripping members supported thereon for relative movement toward and away from each other, means for effecting movement of said gripping members away from each other, means for sensing the angular position of said gripping mechanism with respect to a vertical reference, clamping means responsive to said angular position sensing means and cooperable with said gripping members for exerting a clamping force on said gripping members which urges them toward each other, said clamping means varying said clamping force in dependence on said angular position sensed by said angular position sensing means, and an axle on which said gripping mechanism is pivotally supported, and wherein said angular position sensing means includes a first gear fixedly supported on said axle coaxial therewith, a second gear rotationally supported on said gripping mechanism and having teeth which operatively engage the teeth on said first gear, a cam surface provided on said second gear, and a cam follower movably supported on said gripping mechanism and slidably engaging said cam surface, said clamping means being responsive to movement of said cam follower for varying said force exerted by said clamping means on said gripping members.

19. The apparatus according to claim 18, wherein said clamping means includes electromagnetic means cooperable with said gripping members for exerting said clamping force thereon, a potentiometer operatively coupled to said cam follower, and circuit means electrically coupling said potentiometer to said electromagnetic means, said electromagnetic means varying said clamping force in response to operation of said potentiometer by said cam follower.

* * * * *